United States Patent [19]

Horlbeck et al.

[11] Patent Number: 4,496,713

[45] Date of Patent: Jan. 29, 1985

[54] MOLDING COMPOSITIONS WITH HIGH TOUGHNESS AND HOT-WATER RESISTANCE

[75] Inventors: Gernot Horlbeck, Haltern; Klaus Burzin, Marl, both of Fed. Rep. of Germany

[73] Assignee: Chemische Werke Huels, Marl, Fed. Rep. of Germany

[21] Appl. No.: 544,898

[22] Filed: Oct. 24, 1983

[30] Foreign Application Priority Data

Oct. 25, 1982 [DE] Fed. Rep. of Germany ....... 3239413

[51] Int. Cl.$^3$ .................... C08G 63/02; C08G 63/18
[52] U.S. Cl. ................................. 528/272; 528/308.6; 528/308.7
[58] Field of Search .............. 528/272, 308.6, 308.7

[56] References Cited

U.S. PATENT DOCUMENTS

| | | | |
|---|---|---|---|
| 4,025,492 | 5/1977 | Binsack et al. | 528/308.7 X |
| 4,094,721 | 6/1978 | Sturm et al. | 528/308.7 X |
| 4,131,595 | 12/1978 | Breitenfellner et al. | 524/539 |
| 4,145,335 | 3/1979 | Buxbaum et al. | 528/302 |
| 4,252,940 | 2/1981 | Sublett | 528/308.7 X |
| 4,381,379 | 4/1983 | Toga et al. | 525/444 |
| 4,387,213 | 6/1983 | Horlbeck et al. | 528/272 X |

FOREIGN PATENT DOCUMENTS

| | | |
|---|---|---|
| 7445 | 6/1979 | European Pat. Off. |
| 2023625 | 1/1980 | United Kingdom . |

*Primary Examiner*—Lucille M. Phynes
*Attorney, Agent, or Firm*—Millen & White

[57] ABSTRACT

Molding compositions having high toughness and hot-water resistance, comprise copolyesters based on polybutylene terephthalate and containing as co-component, 5–25 molar percent (based on total diol component) of a linear, long-chain diol. These copolyesters have a viscosity number <120 cc/g.

20 Claims, No Drawings

MOLDING COMPOSITIONS WITH HIGH TOUGHNESS AND HOT-WATER RESISTANCE

BACKGROUND OF THE INVENTION

The present invention relates to molding compositions of improved high toughness and hot-water resistance (stability), comprising copolyesters based on polybutylene terephthalate.

Polybutylene terephthalate, in nonreinforced or reinforced form, is a valuable building material with a number of excellent properties, including high rigidity, surface hardness, abrasion resistance, high deflection temperature under load, dimensional stability, and rapid processability into complicated and large molded components by the injection-molding or extrusion techniques.

A marked drawback of such molded components of polybutylene terephthalate is the relatively low notch impact strength whereby the range of application of these molding compositions is considerably restricted. Threfore, there continues to be a need for modifying polybutylene terephthalate in such a way that the resultant material has a higher toughness.

Heretofore, numerous suggestions have been made for producing molding compositions having high notch impact strength by incorporating aliphatic dicarboxylic acids by condensation into polybutylene terephthalate.

Thus, DOS No. 2,651,650 describes copolyesters of terephthalic acid, 1,4-butanediol, and a branched, saturated aliphatic dicarboxylic acid of 7-30 carbon atoms. DOS No. 2,829,624 discloses copolyesters of terephthalic acid, 1,4-butanediol, and a mixture of adipic, glutaric, and succinic acids as injection-molding or extrusion compositions of high toughness. DOS No. 2,707,852 relates to improving the toughness of polybutylene terephthalate by blending it with copolyesters of terephthalic acid, 1,4-butanediol, and an aliphatic dicarboxylic acid of up to 34 carbon atoms. Reinforced molding compositions based on copolyesters of polybutylene terephthalate, formed by incorporating, by condensation, linear aliphatic dicarboxylic acids of 4-40 carbon atoms, are described in DOS No. 2,924,895.

All of these polybutylene terephthalate molding compositions modified by the use of aliphatic dicarboxylic acids as co-components exhibit the substantial disadvantage that, although they show improved notch impact strength compared with the homopolyester, they exhibit drastically reduced rigidity and marked reduction in hot-water resistance.

SUMMARY OF THE INVENTION

Accordingly, it is an object of this invention to improve the notch impact strength of polybutylene terephthalate molding compositions while maintaining the basic good properties of the homopolyester.

Upon further study of the specification and appended claims, further objects and advantages of this invention will become apparent to those skilled in the art.

These objects have been attained by providing molding compositions of copolyesters based on polybutylene terephthalate which contain as a co-component 5-25 mole %—based on the total diol proportion of the copolyester—of a linear $\alpha,\omega$-alkanediol of 6-20 carbon atoms in the carbon chain and which has a viscosity number (J) of >120 cc/g (measured in a solution of 0.23 g of copolyester in 100 ml of phenol/1,1,2,2-tetrachloroethane [60/40 parts by weight] at 25° C.).

DETAILED DISCUSSION

Suitable $\alpha,\omega$-alkanediols include, for example: 1,6-hexanediol, 1,7-heptanediol, 1,8-octanediol, 1,9-nonanediol, 1,10-decanediol, 1,12-dodecanediol, and 1,16-hexadecanediol; 1,10-decanediol and 1,12-dodecanediol are preferred. They are incorporated by condensation. The $\alpha,\omega$-alkanediol is contained in the copolyester to an extent of 5-25 mole %; preferably, 7.5-20 mole %, especially 10-15 mole %. The data given in mole % refer to the total diol proportion in the copolyester. The $\alpha,\omega$-alkanediol contains 6-20 carbon atoms, preferably 8-16 carbon atoms, especially 10-12 carbon atoms, and is preferably straight chained.

As its other components, the copolyester contains terephthalic acid and 1,4-butanediol derived moieties. The copolyesters are prepared analogously to the preparation of polybutylene terephthalate, as described, for example, in Sorensen and Campbell, Preparative Methods of Polymer Chemistry, Interscience NY, 1961, pp. 111-127; in "Kunststoffhandbuch" [Plastics Manual] vol. 8 (Polyesters), C. Hanser publishers, Munich, 1973, p. 697; and in Journal of Polymer Science, part A 1, 4: 1851-1859 (1966) all of whose disclosures are incorporated by reference herein. Unless indicated otherwise herein, all details of the preparation of the copolyesters of this invention are conventional, e.g., as disclosed in references such as those listed above. In this process, terephthalic acid or its polyester-forming derivatives, e.g., its low-molecular weight dialkyl esters of 1-4 carbon atoms in the alkyl group, are continuously esterified or transesterified, respectively, with 1,4-butanediol and an $\alpha,\omega$-alkanediol of this invention in an inert atmosphere in the presence of conventional catalysts, with removal of the thus-formed water or alkanol, at 150°-220° C., preferably at 170°-200° C. Subsequently, polycondensation is carried out at 230°-270° C., preferably 240°-260° C., under reduced pressure (usually about 0.2-1 millibar).

The diols are used in excess with respect to terephthalic acid, wherein the molar ratio of total diols/acid (or derivative) is about 1.25-2, preferably 1.35-1.6. If the more volatile codiols are utilized, for example, 1,6-hexanediol or 1,7-heptanediol, they are employed in relatively larger excess in the reaction mixture, so that the desired codiol proportion is attained in the finished copolyester. With the use of longer-chain codiols of relatively high boiling point, the molar quantity is selected in correspondence with the desired molar proportion in the finished copolyester. Preliminary routine experiments can be used where necessary to determine optional proportions.

A preferred polyester-forming derivative of terephthalic acid is its dimethyl ester. The inert atmosphere is preferably of nitrogen. Preferred catalysts are organic compounds of titanium, especially titanium tetraisopropylate.

If necessary, a solid-phase condensation can be conducted in order to obtain the finally desired, high viscosity number. See, e.g., British Pat. No. 1,066,162 and U.S. Pat. No. 3,405,098 whose disclosures are incorporated by reference herein. This is conventionally accomplished by bringing the polyester, in granulated or pulverulent form, to temperatures of about 10°-60° C., preferably 15°-40° C., below the melting point. In this temperature range, the copolyester is treated in an inert gas stream, for example in a nitrogen stream, or under vacuum, until the desired viscosity has been obtained.

The copolyesters of this invention generally possess a viscosity number (J) of >120 cc/g, preferably 125-150 cc/g. This property is conventionally attained by conducting the conventional condensation, solid-phase condensation, if necessary, for sufficient durations (British Pat. No. 1 066 162 and U.S. Pat. No. 3,405,098).

The copolyester molding compositions of this invention can optionally contain conventional auxiliary agents and additives in conventional amounts, e.g., 0.1-50 wt %, preferably 1-30 wt % in total. Suitable for this purpose are agents including, for example, nucleating agents, flatting agents, flow agents, or other processing aids, stabilizers against thermal, thermal-oxidative, and/or hydrolytic degradation, as well as pigments, fillers, and reinforcing agents, etc.

The copolyesters of this invention are primarily used as such for the production of molding compositions in fully conventional fashions. Optionally, they can also be blended, e.g., to an extent of 1-50 wt %, preferably 5-30 wt %, with pure polybutylene terephthalate in order to improve the properties of the latter.

As compared with prior art products, the copolyester molding compositions of this invention exhibit improved toughness with simultaneous high rigidity and improved hot-water resistance. This combination of properties could not be expected based on previous knowledge.

The parameters mentioned in the specification and examples were determined using the measuring methods set out below:

The melting point ($T_m$) is the melting maximum of the copolyester determined by differential scanning calorimetry (DSC) (heating rate 16° C./min).

The viscosity number (J) was measured on solutions of 0.23 g of copolyester in 100 ml of phenol/1,1,2,2-tetrachloroethane (weight ratio 60:40) at 25° C.

The notch impact strength is determined according to DIN [German Industrial Standard] 53 453.

The flexural stress at break (as a measure of rigidity) is determined according to DIN 53 452.

The hydrolysis stability of the copolyesters is characterized by the reduction in viscosity number (J) after a 24-hour treatment of the finely ground material with water of 130° C. in a pressure tank.

The viscosity reduction is indicated as a percentage reduction in viscosity number by hydrolysis:

$$((J_0 - J_{Hydr.})/J_0) \times 100$$

($J_0$ = initial viscosity number; $J_{Hydr.}$ = viscosity number after hydrolysis test).

The experiments denoted by letters below are not according to this invention.

Without further elaboration, it is believed that one skilled in the art can, using the preceding description, utilize the present invention to its fullest extent. The following preferred specific embodiments are, therefore, to be considered as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES

Tests 1-4

In a 100-liter reactor, under agitation, 38.8 kg (200 mol) of dimethyl terephthalate is transesterified with 300 mol diol mixture (composition according to Table 1) and 15 g of titanium tetraisopropylate as the catalyst, in a weak nitrogen stream, first for 3 hours at 160° C., then for 2 hours at 200° C. until the amount of methanol to be expected theoretically has been removed by distillation.

Thereupon a water-jet aspirator is used for 2 hours; the reaction mixture is thereafter heated up within another 1.5 hours to 250° C. under agitation. These conditions are maintained for 30 minutes, then a vacuum is applied of <1 mbar, and the reaction mixture is polycondensed until a viscosity number (J) has been reached of 80-100 cc/g. After removal of the vacuum with $N_2$, the melt is discharged in rod shape, cooled in water, granulated, and dried.

The polyester product is about 45 g of granulated material. This granulated material is recondensed in a 500-liter tumbler dryer with a water-jet aspirator at the temperatures indicated in Table 1 within 15 hours up to viscosity numbers of 125-150 cc/g.

Tests A through E

Using the method described in Tests 1-4, copolyesters are produced by melt polycondensation from 200 mol dimethyl terephthalate and free aliphatic dicarboxylic acid (molar ratio see Table 1), 300 mol 1,4-butanediol, with titanium tetraisopropylate (15 g) as the catalyst, and, by solid-phase condensation, brought to viscosity numbers of 125-150 cc/g.

Test F

A copolyester having the composition according to Test 3 is produced by the method indicated above with a viscosity number of 100 cc/g; the notch impact strength amounts to 7 kJ/m². In difference to test 3 there was no solid-phase condensation applied.

TABLE 1

| Test | Composition Copolyester [mol %] | | J [cc/g] | $T_m$ [°C.] |
|---|---|---|---|---|
| | Diol Mixture [mol] | | | |
| 1 | BD/HD = 255/45 | TA//BD/HD = 100//85/15 | 130 | 204 |
| 2 | BD/DD-1,10 = 270/30 | TA//BD/DD-1,10 = 100//85/15 | 137 | 205 |
| 3 | BD/DD-1,12 = 270/30 | TA//BD/DD-1,12 = 100//85/15 | 142 | 205 |
| 4 | BD/DD-1,12 = 280/20 | TA//BD/DD-1,12 = 100//90/10 | 140 | 208 |
| | Acid (Derivative) Mixture [mol] | | | |
| A | DMT/AA = 170/30 | TA/AA//BD = 85/15//100 | 145 | 209 |
| B | DMT/SA = 170/30 | TA/SA//BD = 85/15//100 | 141 | 208 |
| C | DMT/DDA = 170/30 | TA/DDA//BD = 85/15//100 | 138 | 206 |
| D | DMT/DDA = 180/20 | TA/DDA//BD = 90/10//100 | 140 | 214 |

TABLE 1-continued

| Test | Composition Copolyester [mol %] | | J [cc/g] | $T_m$ [°C.] |
|---|---|---|---|---|
| E | DMT/AZA = 180/20 | TA/AZA//BD = 90/10//100 | 133 | 213 |

Meaning of Abbreviations:
BD: 1,4-Butanediol
HD: 1,6-Hexanediol
DD-1,10: 1,10-Decanediol
DD-1,12: 1,12-Dodecanediol
DMT: Dimethyl terephthalate
TA: Terephthalic acid
AA: Adipic acid
SA: Sebacic acid
DDA: Dodecanedioic acid
AZA: Azelaic acid

TABLE 2

| Test | Notch Impact Strength [kJ/m²] | Flexural Stress at Break [N/mm²] | Viscosity Drop [%] |
|---|---|---|---|
| 1 | 17 | 68 | 55 |
| 2 | NB (*) | 60 | 51 |
| 3 | NB | 59 | 49 |
| 4 | 18 | 67 | 45 |
| A | 24 | 50 | 81 |
| B | NB | 30 | 85 |
| C | NB | 30 | 82 |
| D | NB | 45 | 78 |
| E | 11 | 48 | 78 |

(*) NB = No break

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. A copolyester of terephthalic acid or a $C_{1-4}$-alkyl ester thereof and about 1.25-2 moles of diol component per mole of terephthalic component, wherein the diol component comprises 5-25 molar percent, based on the total diol content of a linear $\alpha,\omega$-alkanediol of 6-20 carbon atoms and 95-75 molar percent of 1,4-butanediol, which copolyester has a viscosity number (J) of >120 cc/g (measured in a solution of 0.23 g of copolyester in 100 ml of phenol/1,1,2,2-tetrachloroethane (60/40 parts by weight) at 25° C.) and which has a low viscosity drop when exposed to pressurized water at a temperature of 130° C.

2. A copolyester of claim 1, wherein the $\alpha,\omega$-alkanediol is of 8-16 carbon atoms.

3. A copolyester of claim 1, wherein the $\alpha,\omega$-alkanediol is 1,6-hexanediol, 1,7-heptanediol, 1,8-octanediol, 1,9-nonanediol, 1,10-decanediol, 1,12-dodecanediol or 1,16-hexadecanediol.

4. A copolyester of claim 1, wherein the $\alpha,\omega$-alkanediol is 1,10-decanediol or 1,12-dodecanediol.

5. A copolyester of claim 1, wherein the $\alpha,\omega$-alkanediol content of the diol component is 10-15 mole %.

6. A copolyester of claim 4, wherein the $\alpha,\omega$-alkanediol content of the diol component is 10-15 mole %.

7. A copolyester of claim 1, wherein the molar ratio of diol component to terephthalic component is 1.35-1.6.

8. A copolyester of claim 6 wherein the molar ratio of diol component to terephthalic component is 1.35-1.6.

9. A copolyester of claim 1, wherein the viscosity number (J) is 125-150 cc/g.

10. A copolyester of claim 8, wherein the viscosity nubmer (J) is 125-150 cc/g.

11. A copolyester of claim 1 parepared by a condensation reaction of the terephthalic component and the diol component, followed by a recondensation reaction.

12. In a molding composition comprising polybutylene terephthalate as the major component, the improvement wherein the polybutylene terephthalate is a copolyester of claim 1 whereby the molding composition has improved toughness and hot-water resistance.

13. In a molding composition comprising polybutylene terephthalate as the major component, the improvement wherein the polybutylene terephthalate is a copolyester of claim 2 whereby the molding composition has improved toughness and hot-water resistance.

14. In a molding composition comprising polybutylene terephthalate as the major component, the improvement wherein the polybutylene terephthalate is a copolyester of claim 4 whereby the molding composition has improved toughness and hot-water resistance.

15. In a molding composition comprising polybutylene terephthalate as the major component, the improvement wherein the polybutylene terephthalate is a copolyester of claim 5 whereby the molding composition has improved toughness and hot-water resistance.

16. In a molding composition comprising polybutylene terephthalate as the major component, the improvement wherein the polybutylene terephthalate is a copolyester of claim 7 whereby the molding composition has improved toughness and hot-water resistance.

17. In a molding composition comprising polybutylene terephthalate as the major component, the improvement wherein the polybutylene terephthalate is a copolyester of claim 10 whereby the molding composition has improved toughness and hot-water resistance.

18. In a molding composition comprising polybutylene terephthalate as the major component, the improvement wherein the composition further comprises a copolyester of claim 1.

19. A copolyester of claim 1 having a melting temperature of 204-208° C.

20. A copolyester of claim 1 wherein the $\alpha,\omega$-alkanediol is of 8-20 C-atoms.

* * * * *